March 31, 1942. W. D. FOSTER 2,277,695
MAGAZINE AND FILM HANDLING APPARATUS
Filed Oct. 8, 1934
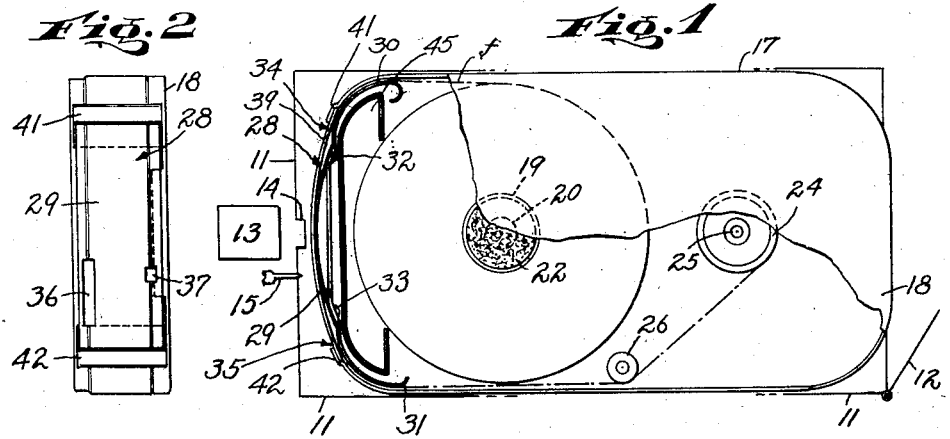
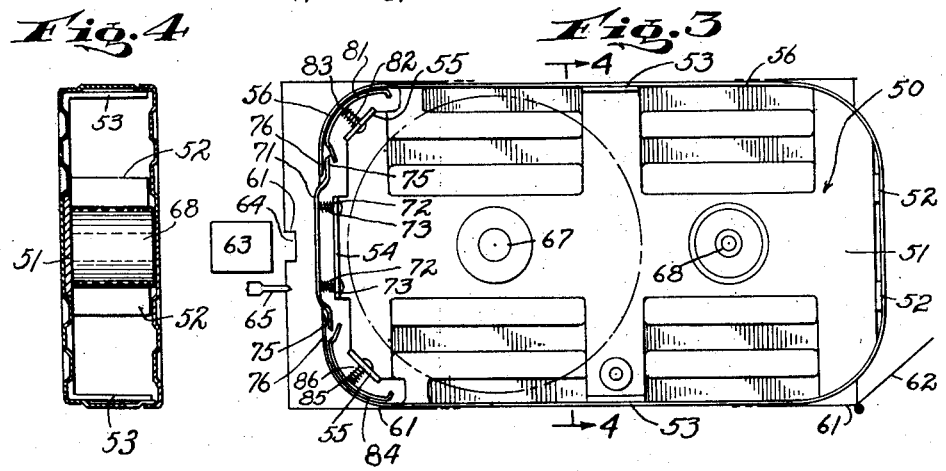
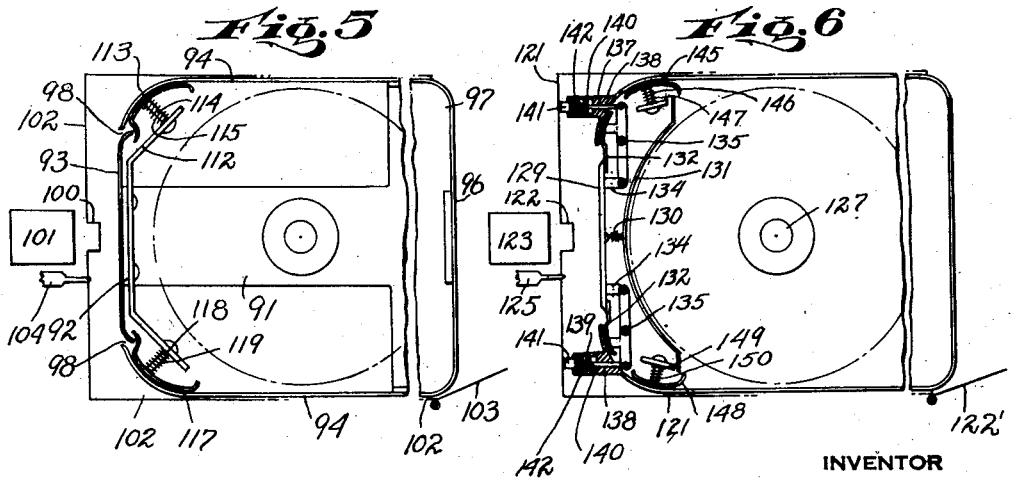
INVENTOR
Warren Dunham Foster Patented Mar. 31, 1942

2,277,695

UNITED STATES PATENT OFFICE 2,277,695

MAGAZINE AND FILM HANDLING APPARATUS

Warren Dunham Foster, Washington Township, Bergen County, N. J., assignor to Kinatome Patents Corporation, Ridgewood, N. J., a corporation of New York Application October 8, 1934, Serial No. 747,473

26 Claims. (Cl. 88—17)

The present invention relates generally to film handling apparatus, particularly cameras, and more particularly to film magazines for use in such apparatus. This application is a continuation in part of my co-pending application, Serial Number 550,778, filed July 14, 1931, which upon October 9, 1934, matured as Patent Number 1,975,782.

In the patent granted to Bundick and Proctor, Number 1,944,022, dated January 16, 1934, there is described and broadly claimed film tension control apparatus for feeding strip material, such apparatus being especially adapted for the feeding of film of the character ordinarily utilized in the taking or projection of so called motion pictures. In my co-pending application Serial Number 550,778, now Patent Number 1,975,782, there is described and claimed a magazine which houses the film and carries auxiliary film feeding means employing the Bundick and Proctor tension control system for cooperation with the film feeding mechanism of a motion picture apparatus.

A chief object of my present invention is to provide improvements in the construction presented and broadly claimed in my said co-pending application. One of such improvements comprises the placing of one section of the film gate upon the magazine in cooperative relation to the tension control means and the placing of another section of the gate upon the film handling apparatus, such gate section carried by the magazine in a preferred form of this invention being a single strip of resilient material which also serves for the film tensioning means.

Since a film carrying magazine is a device which must be manufactured very cheaply for wide distribution, accuracy of manufacture is often impracticable. It is essential, however, that the film carried by the magazine be accurately positioned in relation to the lens of the film handling apparatus. In the past, various compromises have been suggested to meet this need. A primary object of the present invention is to provide a film carrying magazine which may be very cheaply constructed, but so constructed that the film is placed accurately in the desired relation to the aperture and focal plane.

Another object of my invention is to extend a gate section carried by the magazine forwardly of the body of the magazine itself and into operative relation with a gate section carried by the apparatus. In certain forms of my invention, I use the resilience of this gate section carried by the magazine to hold the film in operative relation with the gate section carried by the film handling apparatus. I may also employ such resilience in cooperation with the means for holding the magazine in the apparatus so as to assist in accurately positioning the magazine itself.

Another object of my invention is to provide a structure in which the front wall of the magazine well serves as one of the gate sections, the film passing from the interior of the magazine outside of this section and being maintained by it in operative relation with the fixed gate section carried by the film handling apparatus.

Another object of my invention is to provide a gate section mounted upon the magazine for movement forwardly thereof into operative relation with the gate section carried by the apparatus, such forward movement being definitely determined by control means carried by the magazine and engaging with an appropriate part of the apparatus.

A chief object of my invention is the provision of means for accurately positioning a film carried by a magazine in relation to the lens and/or aperture of a film handling apparatus.

Another object is to provide improved light trapping means for a film magazine.

In my said co-pending application, now Patent Number 1,975,782, of which this application is a continuation in part, I show tension controlling means which also serve to prevent the entry of light into the magazine. Thus in said application I teach the use of one instrumentality for accomplishing two results. An object of the present invention is to combine the above combination with the gate section, and/or to provide common control mechanism therefor.

A related object is to provide improved light trapping means which are rendered ineffective by the introduction of a magazine into a film handling apparatus and rendered effective upon the removal of the magazine therefrom, and such means which are rendered ineffective by the starting of operation of a feeding member of the apparatus and effective upon the stopping thereof.

Another object of my invention is to provide means entirely under the control of a film handling apparatus for accurately positioning a film carried by a magazine in the desired plane of the apparatus. A related object is to provide such means which also serve as a light trap for the film carried within the magazine.

Another object of my invention is to provide improved construction of a film magazine. According to this feature of my invention, I may provide a heavy chassis which determines the accurate position of the gate and magazine itself and a relatively light protective body supported by the chassis, the whole being much stronger and no more expensive to build and no more bulky than the present lightly stamped and inaccurately made magazines.

Among the features of my invention are the provision of improved means for:

1. Operating a gate;
2. Positioning a film in accurate relation to the lens of a film handling apparatus;
3. Preventing the entry of light to the interior of a film carrying mechanism;
4. Cheaply and efficiently constructing a film magazine.

Another object is the provision of an improved gate structure.

Another important object is to accomplish all of the above objects cheaply and without increasing the bulk of a magazine.

Other objects, features, characteristics and advantages of my invention will be apparent from the following portion of this specification, the attached drawing, and the subjoined claims. It will of course be understood that I am showing only certain forms of my invention as illustrative only, and that changes may be made therein without departing from the spirit of my invention or the scope of my broader claims.

In the drawing:

Figure 1 is a top plan view, broken away in part, of a form of my invention in which the gate and tensioning members comprise a single leaf spring member mounted upon the forward portion of the magazine.

Figure 2 is an end of the structure shown in Figure 1, with a front protective member omitted for clarity.

Figure 3 is a top plan view of a magazine, the cover member being removed, of the form of my invention employing a relatively heavy chassis to which the gate is resiliently mounted and upon which the remainder of the magazine is supported.

Figure 4 is a view taken along the line 4—4 looking in the direction of the arrows.

Figure 5 is a partial top plan view of a form of my invention in which I utilize the front wall of the magazine as a gate section.

Figure 6 is a partial top plan view of a form of my invention in which I position the gate member carried by the magazine by control means which will coact with a wall of the film handling apparatus.

For use in the form of my invention shown for purposes of illustration in Figure 1, I may provide a camera which has a magazine-receiving housing which includes wall members 11, which are shown only in part. At the rear of this housing, a hinged member 12 may serve to hold the magazine in operative relation with the apparatus after it has been moved within the housing therefor placed within the apparatus. Mounted at the front of the apparatus is a lens 13 cooperating with an apertured film engaging member 14 which extends backwardly from the front section of the wall 11. This apertured piece 14 is in effect the front and fixed gate section, which it will be noted is mounted upon the apparatus. A claw 15 is provided to feed the film. If desired, a positioning finger not shown, may also be employed.

As used herein and in the subjoined claims, the words "forwardly" and "outwardly" or "front" or the like and those cognate thereto mean or refer to a direction toward the apertured member of the apparatus which lies at the front of a film handling apparatus with which this magazine is used, the front of such an apparatus being that which carries its objective lens, or if such words are applied solely to the magazine in a similar direction relative to the magazine alone, the magazine being considered as it would be if positioned within the apparatus with its opening which renders the film accessible to the apparatus in operative position relatively thereto. Conversely the words "backwardly" or "within" or "toward the interior of" or the like and those cognate thereto as applied to magazine or apparatus as used together or a magazine as used alone indicate the contrary direction.

The magazine of the form shown in Figure 1 may consist of a stamping 17 in the form of a substantially rectilinear container and a cover member 18 which together form a housing for the film. The film f is wound upon a delivery core 19, journalled as at 20. Attached to the top of the core 19 is a fixed braking substance 22, such as felt, cork or fiber, for coaction with the cover in order, if desired, to place a fixed resistance upon the delivery reel. A take-up coil 24 is journalled as at 25. The film may pass to the take-up coil over a positioning roller 26.

A gate section, generally indicated as 28 is mounted upon the magazine and extends forwardly therefrom. This section may be in the form of a single spring member, suitably relieved, having a portion 29 which serves as the gate proper and tensioning film engaging extremities 30 and 31 cooperating respectively with the delivery and take-up reels. This single spring may be supported as at 32 and 33 upon a front section of a side or edge wall member of the magazine. Openings 34 and 35 are provided to permit the film to pass from the interior of the magazine along the gate face 29 and back into the magazine. Openings 36 and 37 respectively are provided for the moving claw 15 and a positioning member, if desired, not shown.

Relatively thin spring steel may be used for the unitary tensioning and gate member 28. If production is in large quantities, the spring stock may be rolled with a central relief or this relieved portion may be formed in a surface grinding operation. The rivets or other members which hold the strip of spring steel at 32 and 33 of course extend through the relieved portion of the gate member and do not engage the surface of the film.

A gate, formed as described immediately above, may be used in a conventional apparatus in which both gate sections are mounted thereupon. In case the tension arms are not formed integrally with the gate portion, the resilient member at one or both points of attachment may be slightly slotted.

In order to protect the small section of the film which is exposed to the action of light, a strip 39 of cardboard, light copper or other metal or other light material of some elasticity may be placed between the ears 41 and 42 which are formed integrally in a side wall of the magazine. Just before the magazine is placed within the camera, the protective strip may be removed. Either a few frames of film may be fogged prior to loading or a leader strip employed.

As will readily be seen by referring to Figures 1, 3, 5 and 6, I provide simple and effective means for light trapping the interior of the magazine. In the form shown in Figure 1, the tension controlling extensions 30 and 31 of the gate section 28 are formed with a curvature corresponding to that of the adjacent portions of the side wall of the magazine. As feeding force is applied to the film by the claw 15 and the taking up member 25, the springs 30 and 31 are moved inwardly toward each other and away from the side wall, thereby permitting easy movement of the film. At such times, however, the film magazine will be completely within its housing within the camera and light cannot enter except through the lens. As the magazine is removed from the camera, however, the feeding operation will have been stopped and the resilience of the members 30 and 31 will immediately close the passageway from the exterior of the casing to the interior thereof. In order to prevent the entrance of light over the edge of the members 30 and 31, a portion 45 of the body of the magazine is struck inwardly and to a point upwardly of the lower edge of the arms 30 and 31. A similar formation, not shown, struck inwardly in the cover member 18 prevents light from passing by the edges of these members. These depressions serve as the conventional strengthening ribs and consequently add nothing to the bulk of the magazine.

As the magazine is slipped into the housing provided therefor, the closing of the member 12, or an equivalent thereof, will force the film against the projecting apertured fixed gate member 14. Tension is thereby applied to the film in that the film is held by the resilience of the gate portion 29 of the movable or magazine carried gate member 28 in proper operative relation with the fixed gate member 14. If the magazine is slightly inaccurate in its construction, or has been subjected to moderate injury, no effect thereof will be communicated to the film, since the positioning of the film against the fixed member 14 and hence its proper operative relation to the lens 13, depends upon the resilience of the movable gate member, which has a sufficient range of movement so that it is operative through a considerable distance along the optical axis of the apparatus.

As the intermittent feeding member 15 draws film from the delivery reel 19, and the taking up member 24 removes the film from the intermittent feeding member, the film tensioning members 30 and 31 perform the auxiliary tensioning and feeding function which is defined at length in my parent patent and in said Bundick and Proctor Patent Number 1,944,022. The resistance to rotation applied to the mass of film upon the delivery core 19 by the substance 22 will be sufficient to prevent an over-running of the film making up the delivery coil and will give to the delivery tensioning member 30 the bight which is necessary for its most efficient operation. This resistance will be sufficient also to maintain the tensioning member 30 away from the outside wall of the casing and so prevent an undue rubbing effect upon the film.

In the form of my invention shown for purposes of illustration in Figure 3, I provide a chassis member 50 constructed of relatively heavy metal, preferably steel, and having sufficient body to hold accurately in place the much lighter metal which forms the covering portions of the casing. From a main longitudinally extending portion 51 of this chassis member there may be turned up positioning portions 52, 53, 54 and 55. The positioning elements 52 serve not only as a point of attachment for the rear portion of the side or edge wall 56 of the casing, but they also accurately position the rear of the magazine in relation to a member, later described, which holds it within the housing provided for it. As best seen from Figure 4, this side or edge wall 56 serves to maintain the flat and relatively broad bottom wall of the body of the container and the corresponding top wall of the cover in spaced and parallel relation to each other. The upwardly extending portions 53 serve to position the longitudinally extending side wall portions of the casing and an upwardly struck portion 54 serves as a support for a gate. The upwardly struck portions 55 serve to support tensioning members. The bottom wall of the light housing is ribbed in order to strengthen it, and, as will be observed from the drawing, a large central rib and three right angled transverse ribs form a cradle for the above described chassis. Other longitudinally extending ribs add to the strength of the casing. The cover likewise is ribbed. It will thus be observed that the provision of the chassis increases the bulk of the magazine very little, if at all, and adds greatly to its strength, rigidity and accuracy. This one member is very easily and cheaply made with great accuracy, and retains the form in which it is originally struck.

The housing into which the magazine is slipped may be of the sort previously described. It may consist of bounding surfaces 61 to a rearwardly extending one of which a door 62 is hinged and to a forward one of which a lens 63 is applied. A rearwardly extending apertured projection 64 defines the focal plane of the lens at which the film must be exposed. A feeding claw 65 may be supplied for intermittently feeding the film.

Journalled in the transversely extending portion 51 of the chassis are a delivery spindle 67 and a take-up spindle 68, driven by the apparatus in a conventional way, not shown. Any desired type of light-trapping means may be applied to the spindles. The take-up spindle 68 is resiliently driven by the apparatus in any conventional or desired manner, not shown.

A gate section 71 is mounted upon the studs 72 which extend forwardly from the struck up portion 54 of the chassis. Springs 73 tend to move the gate section 71 forwardly into engagement with the apertured member 61. As will be readily seen from Figure 3, offset extensions 75 of the movable gate section 71 cooperate with the terminal portions 76 of the side wall 56 of the casing to form a light trap as the springs 72 propel the gate section 71 all the way forwardly, as, for example, when the magazine is outside of the camera. These extensions 75 and the cooperating portions 76 of the magazine wall may be formed in any desired shape to exclude the light. As shown, the extensions may extend from the gate section proper first in a curve and then in a straight line. The ends of the cooperating portions of the side or edge wall may carry corresponding curved and straight portions.

A delivery tensioning member 81 may be mounted upon a stud 82 movable through the supporting portion 55 of the chassis under the influence of a spring 83. Similarly, a take-up tensioning member 84 may be mounted upon a stud 85, which is movable through the supporting portion 55 of the chassis under the influence of a spring 86. If desired, the delivery and take-up tensioning members 81 and 84 may each be formed of a leaf spring. As will be noted from the drawing, each end of the tension members is irregularly shaped to assist their light trapping effect. It will be understood that except when the film is being moved, the springs 83 and 85, which force the members 81 and 84 against the film, hold it relatively tightly against the cooperatingly curved portions of the side walls of the magazine so that light may not enter, but when under the feeding influence of the intermittent feeding member 65 and the take-up member 68 the film is moved, each of the tensioning members will be moved back from the side wall so that the film will slip by without contact with the side wall, but the film will be subjected to the normal tensioning influence of the tensioning members.

As the magazine is slid into its housing, the apertured member 61 will bear against the film and the movable gate section 71. This movable and resiliently supported gate member will maintain the film in operative relation to the lens, irrespective of minor variations in the magazine. The operation of the tensioning members in relation to the mass of film upon the delivery coil and the take-up coil under the intermittent feeding influence will be as described in my parent application and in the said patent to the said Bundick and Proctor.

If desired, the movable gate section 71 may be mounted upon the magazine in any conventional manner, and the chassis omitted.

Figure 5 shows a variation of my invention which is slightly more simple to construct. A chassis member 91 has a forward struck up portion 92 which extends directly behind a front section 93 of a side or edge wall member 94, this side wall member being attached thereto and maintained in predetermined position thereby. At the rear or the right as viewed in Figure 5, a struck up portion 96 supports the back portion 97 of the side wall member so that the front side wall portion 93 is always in accurately fixed relation to the back wall portion 97. Since the chassis member 91 may be made accurately, each magazine will be of dimensions which closely correspond to that of other magazines. Above and below the forward portion 93 of the side wall are openings 98 through which the film passes for engagement with the backwardly projecting apertured gate member 100 of the apparatus adjacent which the lens 101 is placed. Wall members 102 define the housing together with a hinged door 103. A feeding member 104 moves the film from the delivery coil over the forwardly extending member 93, while a conventional take-member (not shown) draws the film back into the magazine. It will thus be seen that the front wall 93 of the magazine serves as a movable gate member since it moves with the magazine and as the magazine is placed in assembled relation to the apparatus it brings the film into operative contact with fixed gate section 100 permanently fixed upon the apparatus thus in effect closing the gate.

This front wall member which serves as the movable gate section may be relieved and should preferably present a relatively smooth and hard surface to the film which travels across it. Light surface grinding of the whole surface will remove slight irregularities, and the relief may be furnished by additional grinding although a pressing operation is preferable. If desired, this end only of the housing may be plated with nickel or chromium, and the plated portion protected, as by Scotch tape, during the spraying or dipping of the housing as a whole. The housing, preferably exclusive of the cover portion, may be punched from very light steel of high carbon content, the lightness of the gauge making for ease and economy and the carbon content making the metal sufficiently hard to resist the slight rubbing action of the film.

Likewise supported by the forward portion 92 of the chassis is a support 112 to which tension members are resiliently attached, the delivery tensioning member 113 by a stud 114 and under the influence of a spring 115, and a take-up tensioning member 117 upon a stud 118 and under the influence of a spring 119. It will be understood that the primary movement of the film together with the inertia of the delivery coil separates the tension members 113 and 117 from the cooperatingly curved walls of the magazine while the stopping of such movement will again cause these members to engage the walls and operate as a light trap by holding the film tightly against the wall. As will be seen from Figure 5, the side portions of the tension members 113 and 117 are so shaped as to block the openings 98 while the film is at rest.

Figure 6 shows another exemplification of my invention, in which a gate member carried by a magazine is accurately positioned by a wall portion of a housing for the magazine within the apparatus.

As previously described, wall members 121, together with a movable door member 122', form a housing into which a magazine may be slipped. Projecting from a front wall of this housing is an apertured member 122 associated with the lens 123 and in effect forming the fixed gate section of the apparatus. A claw member 125 is shown for feeding a film from a delivery coil supported upon a delivery spindle 127 to a conventional take-up coil, preferably resiliently driven (not shown).

For purposes of illustration, the members which operate the movable gate section and the light trapping shields of Figure 6 are shown as relatively larger than they appear in actual practice, since otherwise the drawing would be difficult to follow. The relative size of these members, however, in no way limits the invention.

Forwardly of the magazine and opposite both the fixed gate section 122 and the claw 125 there is positioned a movable gate section 129, which is always urged backwardly by a very weak spring 130 which extends between it and the shield 131 which partially surrounds the delivery coil of the film. Movable with this gate section are irregularly shaped light trapping shields 132. The gate section 129 is mounted upon two sets of links 134 pivoted to each other and pivoted upon points 135. These links may be moved forwardly and backwardly by thin rods 137 pivoted at the inner ends of each to the links and projecting forwardly through light traps 138 into cylinders 139 projecting forwardly from the magazine and attached to plungers 140. In the ends of these plungers are flanged contact buttons 141, which contact with portions of the wall 121 of the magazine receiving housing. Between the plungers 140 and the flanges of the contact buttons 141 compression springs 142 are provided. It will thus be seen that as the magazine is pushed forwardly into the housing, the contacting buttons 141 engage a portion of the wall 121 and against the influence of the light spring 130 compress the springs 142 and force the movable gate section 129 and the film extending therealong into operative relation with the apertured member 122. As the feeding of the film progresses, the springs 142 give the usual relief to the film to accommodate inequalities in thickness or other unusual conditions and maintain the film flat at the aperture and hold it in operative relation to the claw 125.

The light trapping members 132, previously mentioned, are likewise mounted upon the linkages 134, but upon the sides of the pivots 135 opposite to those upon which the movable gate section 129 is mounted. It will therefore be understood that as the contacting members 141 move the gate section 129 forwardly into operative relation with the gate section 122 in preparation for the feeding of the film, the light trapping members 132 are moved in the opposite direction and away from the film and away from the ends of the movable gate section with which they have previously been in contact. While the compression springs 142 are not operative to move the gate forwardly, as when the magazine is without the apparatus, the spring 130 holds the gate section 129 and the shields 132 in light blocking relation to each other.

A delivery tensioning member 145 mounted upon a stud 146 appropriately supported within the magazine and under the influence of a spring 147 and a take-up tensioning member 148 supported upon a stud 149 appropriately supported within the magazine under the influence of the spring 150, furnish the necessary compensation for the differences in character of movement of the masses of film upon the delivery and take-up reels and the section of film being intermittently fed between such masses, in the manner described in my parent application and also in the said Bundick and Proctor Patent 1,944,022.

In the forms of my invention shown in Figures 3, 5 and 6, depressions struck in the bottom and top walls of the housing may cooperate with the light trapping means, as described in connection with Figure 1. A chassis may likewise be provided in the form of that shown in the magazines of Figures 1 and 6.

The film tensioning means shown in Figures 3, 5 and 6 are in accordance with the improvement over the Bundick and Proctor system which is described and broadly claimed in the co-pending application Serial Number 567,108, filed October 5, 1931, of Frederick Davenport Sweet and myself, which upon April 23, 1935, matured as Patent Number 1,998,453. It is to be understood, however, that any other desired form of tensioning means may be employed, as, for example, those making use of leaf springs. If, however, the film engaging surfaces 81, 84, 113, 117, 145 and 148 are made in the form of leaf springs, and such springs are supported resiliently as shown, very effective auxiliary feeding, tensioning and light trapping devices result. The leaf springs furnish the bulk of the compensation necessary during the feeding operation, while the tension springs take care of unusual conditions of feeding and furnish the necessary power for the light trapping. To prevent binding, the guiding means shown in said Patent Number 1,998,453 may be employed, but are omitted from this drawing for clarity.

I illustrate my invention as applied to a camera, but, with certain modifications, such as the use of prisms as taught in the co-pending application of George William Ford, Serial Number 549,067, filed July 6, 1931, which upon July 28, 1936, matured as Patent Number 2,048,691, or the use of reflected light, it may be employed in a projector. It is primarily intended for use with apparatus in which the film feeding movement is intermittent, but, as taught in my co-pending application Serial Number 706,768, filed January 15, 1934, which upon November 12, 1940, matured as Patent Number 2,220,997, which is a continuation in part of my Patent Number 1,943,303, such tension controlling mechanism is effective for "ripple-killing" purposes in connection with a film which is moved continuously as for sound recordation or reproduction, or in connection with the optical rectification of images. Moreover, the light trapping and positioning features of my invention are applicable to still cameras.

It will be noted that apparatus and magazines built in accordance with this invention, except the form of Figure 5, do not depend upon a wall of the housing of the apparatus for accurately positioning the gate section carried by the magazine. Even in the form shown in Figure 6, the spring plungers allow a variation in construction between various pieces of apparatus. In every instance, the film, which is extended outwardly away from the interior of the magazine, is brought into the correct focal plane by automatic means which depend for their accuracy upon neither magazine nor apparatus as a whole but upon predetermined surfaces thereof closely associated with the aperture which as is necessary and conventional in this art must lie in the focal plane of the lens.

Many of the advantages of my invention will be obvious from the foregoing portion of this specification, the attached drawing, and the sub-joined claims.

Other advantages include the provision of means whereby a film magazine although cheaply made will accurately position the film carried thereby in a film handling apparatus. Another advantage is the provision of light trapping means for a magazine which are automatically rendered inoperative upon the placing of the magazine within a camera and automatically rendered operative upon the removal of the magazine from the camera. Other advantages follow the use of unitary means for positioning a film in operative relation to the apparatus and for controlling the tension thereof during a feeding operation. Other advantages include the combination of an operable gate and operable light trapping means, one being operated by the other thereof. Other advantages include the operation of light trapping means by the means for accurately positioning the film as within the apparatus. Still other advantages include the use of a resilient gate member extending outside or toward the outside of the magazine for both maintaining the film in the desired operative relation with the aperture and feeding member or either thereof irrespective of minor manufacturing variations in the construction of said magazine, or of the apparatus, except for means defining the focal plane thereof and closely associated therewith, with which it is used. Still further advantages include the use of the front wall of a film containing magazine as a movable gate section.

I claim:

1. For use in a film handling apparatus, a magazine having a walled housing for supporting and protecting a motion picture film, a film frame exposure aperture in a wall of said housing, means within the housing adjacent opposite sides of said aperture for supporting a film pressure plate, said pressure plate comprising a flexible resilient strip of metal, means fixedly to attach said plate to each of said supporting means with its middle portion bowed forwardly relatively to said aperture and spaced from the edges of the aperture to provide exit and entrance openings for the film, and supply and take-up means in the magazine for said film.

2. In combination, a magazine having a walled housing for supporting and protecting a motion picture film, a film frame exposure aperture in a wall of said housing, means within the housing adjacent opposite sides of said aperture for supporting a film pressure plate, said pressure plate comprising a flexible resilient strip of metal, means fixedly to attach said plate to each of said supporting means with its middle portion flexibly bowed forwardly relatively to said aperture and spaced from the edges of the aperture to provide exit and entrance openings for the film, supply and take-up means in the magazine for said film, and a film handling apparatus having a fixed gate section complementary to said film pressure plate of said magazine and means for mounting said magazine thereupon so that said middle portion of said pressure plate of the magazine which is flexibly bowed forwardly is engaged and depressed by said fixed gate section and flattened into parallel relation therewith.

3. In combination, a magazine and a film handling apparatus; said magazine having a walled housing for supporting and protecting continuously moving delivery and take-up portions of a film and a unitary combined gate section and compensating member in the form of a single resilient strip, means for attaching said strip to said magazine at an exposure opening in the housing and adjacent an edge wall of said housing at two relatively central spaced points therein adjacent the ends of the exposure opening and intermediate the ends of said strip thereby leaving each end portion of said strip free to vibrate, said two spaced points being at a greater distance one from the other along the surface of said strip than the distance in a straight line between said points thereby bowing the strip into an arc extending from the chord formed by said line in a direction toward an adjacent exterior portion of said magazine, the end portions of said strip extending from said points of attachment and toward the interior of said housing and being bowed, the film being guided so that said bowed end portions engage the film in bights; said film handling apparatus having a gate section complementary to the arcuate central portion of said unitary strip, means for intermittently moving the film, and means for mounting said magazine upon said apparatus so that the arc formed by said central arcuate portion of said resilient strip is engaged and depressed by said fixed gate section and flattened into parallel relation therewith and the film extending along said arcuate portion is engaged between it and said gate section of said apparatus and maintained in operative relation thereto and said intermittent feeding member is disposed in operative relation to said film, the difference in character of movement of said continuously moving delivery and take-up masses and the portion of the film engaged and advanced by said intermittent feeding member being compensated by the vibration of said free resilient ends of said resilient strip.

4. For use in a film handling apparatus, a magazine having a walled housing for supporting and protecting delivery and take-up portions of a film and a single unitary combined gate section and tensioning member in the form of a single resilient strip, means for attaching said strip to said magazine at an exposure opening formed in an edge wall of said housing at two relatively central spaced points therein adjacent upper and lower parts of the opening and intermediate the ends of said strip thereby leaving each end portion of said strip free to vibrate, said two spaced portions being at a greater distance one from the other along the surface of said strip than the distance in a straight line between said points thereby bowing the member into an arc extending from the chord formed by said line in a direction toward an adjacent exterior portion of said magazine, the end portions of said strip extending from said points of attachment and toward the interior of said housing and being bowed to form film engaging portions, and means for guiding the film so that said bowed end portions engage the film in bights.

5. In combination, a magazine for supporting and protecting a film, said magazine including a relatively strong and accurately formed skeletal chassis member separate from the housing and a relatively light housing attached thereto and stiffened and supported thereby, a gate section mounted upon one end of said chassis member adjacent an exterior wall of said housing and having a film engaging portion, said gate section and said housing having means for guiding a film along said film engaging portion, said chassis member extending in a direction away from the portion of said magazine adjacent which said gate section is mounted and into contact with a wall of said magazine relatively distinct therefrom, and a film handling apparatus, said apparatus having means for mounting said magazine in operative relation thereto, a member operatively engaging said gate section of said magazine for cooperating therewith for maintaining the film in the focal plane of said apparatus when said magazine is mounted in said apparatus, and means for mounting said magazine in said apparatus, said mounting means including an instrumentality engaging the portion of said wall of said magazine adjacent that in contact with said chassis member and effective for forcing said magazine into operative position in the apparatus wherein said member of said apparatus operatively engages said gate section, the positioning of the film in the focal plane of the apparatus thereby being determined by the relatively heavy chassis member and not by the relatively light housing attached thereto.

6. For use in a film handling apparatus having an apertured gate section and means for engaging a portion of a wall of a magazine for holding the film carried thereby in relatively fixed relation to the aperture of said gate section, a film magazine comprising a rectangular housing formed with relatively large thin and compressible top and bottom walls joined in spaced parallelism by relatively narrow thin compressible side or edge walls, and a skeletal chassis member for strengthening said housing and assuring accurate positioning of the film carried thereby in relation to said apparatus when the magazine is placed therein, said chassis member being stiffer than said walls and immediately associated with and substantially as long as one of the relatively larger walls of said housing, a gate section mounted upon one end of said chassis member near an exterior portion of said magazine, and the other end of said chassis member being formed to abut against the portion of the wall of said magazine which is engaged by the holding means of said apparatus, whereby said chassis member by such engagement assures the accurate positioning of said gate section and the film carried thereby relatively to said apparatus since the accurate positioning of the film is not dependent upon said relatively thin and compressible walls of said magazine.

7. A film magazine for use in a film handling apparatus having means engaging a wall of the magazine for positioning it in operative relationship to said apparatus and means engaging the film for feeding it, said film magazine comprising a chassis member of relatively heavy and accurate construction and an enclosing substantially rectilinear casing of relatively light thin and compressible construction, said chassis member being formed with a narrow section substantially equal in length to that of the casing but of much less width than that of the adjacent side of the casing and with a plurality of narrow rectilinear extensions therefrom of which at least one thereof extends from said longitudinal section to the sides of said casing, the outer portions of said chassis member being struck at substantially right angles to the body portion thereof to abut against and provide an accurate framing support for outer walls of said casing whereby said magazine is relatively accurately positioned in relation to said apparatus notwithstanding relatively large manufacturing variations in the construction of said casing.

8. In combination, a film magazine and a film handling apparatus, said magazine having a substantially flat skeletal chassis member of relatively heavy and accurate construction but of relatively small bulk and area, an enclosing housing of relatively thin light and compressible material, means for supporting a film within said housing, means cooperating with said plane-determining member of said apparatus for positioning the film in proper relation of said focal plane of said apparatus, and means for mounting said supporting means and said cooperating plane-determining means upon said chassis member; said film handling apparatus having film feeding means, a member operatively engaging a film for determining its position within the focal plane of the apparatus, and means for positioning said magazine in relation to the apparatus, said positioning means including an instrumentality engaging the portion of said wall of said magazine adjacent that in contact with said chassis member whereby said relatively heavy chassis member and not said relatively light housing determines the operative position of the film.

9. For use in a film handling apparatus having a gate section and means for mounting a magazine in operative relation thereto, a magazine for supporting and protecting a film, said magazine including a relatively strong and accurately formed chassis member and a relatively light housing attached thereto and supported thereby, a gate section having a portion adjacent an exterior portion of said magazine engageable by a film which passes from the interior of said magazine over said gate section and toward the interior of said magazine, means for mounting said gate section so that it extends forwardly in a direction away from the interior of said magazine toward the gate section carried by said apparatus, said chassis member extending away from the portion of said magazine wherein said gate section is mounted and to the opposite periphery thereof and into engagement with the adjacent portion of said light housing, the mounting means of said apparatus and said chassis member being so disposed that when said magazine is mounted in said apparatus said mounting means bears directly upon the portion of said thin housing which is supported directly by said chassis member whereby said heavy chassis member and not said light housing determines the accurate positioning of said gate section in relation to said apparatus.

10. In combination, a magazine for supporting and protecting a film, a single gate section movably mounted adjacent a face of said magazine and so disposed that a film supported by said magazine may extend along said gate section, positioning means attached to said movable gate section and extending beyond the face of said magazine, and a film handling apparatus having a relatively fixed gate section complementary to said gate section of said magazine, an accurately and predeterminedly placed formation thereupon, and means for mounting said magazine in operative relation to said apparatus so that said gate sections are in alignment one with the other and so that said positioning means of said magazine engages said formation of said apparatus and moves said movable gate section of said magazine into cooperative relation with said gate section of said apparatus.

11. For use in a film handling apparatus having means for mounting a magazine in operative relation thereto and an accurately and predeterminedly placed formation thereupon, a magazine for supporting and protecting a film, said magazine having an edge wall formed with an exposure opening therein, a gate section having a film-engaging surface and a support therefor disposed in said magazine opposite said opening, a locating contact button disposed in openings formed in said edge wall above and below said exposure openings respectively and engageable with said formation upon said apparatus, spring means for moving said gate section in relation to said exposure opening, and an operative connection between each of said contact buttons and said support for moving said support against the power of said spring means upon the movement of said contact buttons by their engagement with said formation.

12. In combination, a film handling apparatus and a film magazine for use therewith; said apparatus having means for mounting a magazine in operative relation thereto, means establishing a focal plane, and an accurately and predeterminedly placed formation; said magazine having an edge wall formed with an exposure opening therein, a gate section having a film engaging surface and a support therefor disposed in said magazine opposite said opening, a locating contact button disposed in openings in said wall above and below said exposure openings respectively and engageable with said formation upon said apparatus, spring means for moving said gate section in relation to said exposure opening, and a connection between each of said contact buttons and said support for moving said support against the power of said spring means upon the movement of said contact buttons by their engagement with said formation when said magazine is mounted in operative relation to said apparatus for moving said film engaging surface into said focal plane of said apparatus.

13. For use in a film handling apparatus having means for mounting a magazine in operative relation thereto and an accurately and predeterminedly placed formation thereupon, a magazine for supporting and protecting a film, said magazine having a housing, a plate fixedly mounted in said housing between an exposure opening in an edge wall of said housing and the interior of the magazine, a gate section having a film engaging surface and a support therefor disposed between said plate and said exposure opening and movable in relation thereto, a spring connecting said plate and said support for moving said gate section relatively to said plate and hence to said magazine, and locating means extending from said support to engagement with said accurately formed surface when the magazine is mounted in operative relation to said apparatus for moving said film engaging surface against the power of said spring into a predetermined relation to said apparatus.

14. In combination, a film handling apparatus and a film magazine for use therewith; said apparatus having means for mounting a magazine in operative relation thereto, means establishing a focal plane, and an accurately and predeterminedly placed formation; said magazine having a housing, a plate fixedly mounted in said housing between an exposure opening in an edge wall of said housing and the interior of the magazine, a gate section having a film engaging surface and a support therefor disposed between said plate and said exposure opening and movable in relation thereto, a spring connecting said plate and said support for moving said gate section relatively to said plate and hence to said magazine; and locating means extending from said support to engagement with said accurately formed surface when the magazine is mounted in operative relation to said apparatus for moving said film engaging surface against the power of said spring into said focal plane of said apparatus.

15. For use in a film handling apparatus having means for mounting a magazine in operative relation thereto and an accurately and predeterminedly placed formation thereupon, a magazine for supporting and protecting a film, said magazine having an edge wall formed with an exposure opening therein, a gate section having a film engaging surface and a support therefor disposed in said magazine opposite said opening, a locating member disposed in an opening formed in said edge wall upon each side of said exposure opening respectively and engageable with said formation upon said apparatus, spring means for moving said gate section in relation to said exposure opening, a connection between each of said members and said support for moving said support against the power of said spring means upon the movement of said members by their engagement with said formation, and positive means for limiting such movement.

16. For use in a film handling apparatus, a film supporting magazine, a gate section, a mounting upon said magazine for said gate section, forwardly extending spring pressed plungers adapted to contact a fixed portion of said apparatus as said magazine is placed in assembled relation therewith, and a connection between said gate mounting means and said plungers for moving said gate into operative relation to a complementary gate section mounted upon said apparatus as said plungers are depressed by contact with said fixed portion.

17. For use in a film handling apparatus having a structure adapted for the reception of a magazine therewithin, a film supporting magazine, said magazine including a housing for protecting the film, one wall of said housing being formed with an opening, a gate section having a mounting within said housing and movable thereupon through said opening to a position without said housing, and means for moving said gate section to said position without said housing, said moving means comprising a member projecting forwardly of said housing and operatively connected with said gate section and movable by contact with a portion of said magazine-receiving structure of said apparatus when said magazine is placed in operative relation to said structure of said apparatus whereby the placing of said magazine in operative relation to said structure moves said gate section forwardly.

18. A film magazine including a housing for protecting a film, a gate section mounted for movement in a direction away from the interior of said magazine, and means for so moving said gate section, said moving means including a member extending exteriorly of said housing and normally spring-pressed to move said gate section to a position toward the interior of said housing.

19. A film magazine including a housing for protecting a film, a gate section mounted for movement between a first position toward the interior of said housing and a second position toward the exterior of said housing, means for moving said gate section between said positions, and an operating member for said moving means extending to a position upon the exterior of said housing and interconnected with said gate moving means for operating said means.

20. A film magazine having a housing, a wall of said housing being formed with an opening, a gate section opposite said opening, a mounting within said magazine for said gate section, said mounting comprising two links pivoted relatively adjacent their central portions, a link connecting one end of each of said links with said gate, movable actuating members for said mounting extending to points exterior of said housing, a link connecting each of the ends of said first mentioned links not connected to said gate to one of said actuating members, and spring means tending to move said mounting and said gate section in one direction, the movement of said actuating members toward said magazine being effective to move said gate section in the opposite direction.

21. For use in a film handling apparatus having a film-moving member and means for mounting a magazine thereon, a film magazine for supporting and protecting a portion of a film and comprising a substantially rectangular housing having a walled edge member with curved corners, an opening in said wall member for rendering the film accessible to said apparatus, tensioning means disposed within the interior of said housing and adjacent one of said curved corners, said tensioning means having a film-engaging surface of a curvature substantially the same as that of said curved portion of said wall, the film being so mounted within said magazine that it passes along the interior of said wall adjacent said curved corner and between said curved corner and said curved film engaging surface of said tensioning means, resilient means for moving said curved film engaging surface toward said housing, and a mounting for said film engaging surface so disposed that said resilient means moves said surface in a line substantially normal to the line of travel of the film so that the film is engaged upon one side by said tensioning member and upon the other side by the curve of said housing whereby when the film is not being moved by a film-moving member of said apparatus and hence under tension entry of light to the interior of said housing is impeded, said curved corner of said magazine and said curved film engaging surface of said tensioning means in cross section thereupon being substantially parallel and said film-engaging surface under the influence of said resilient means while said film is being moved by a film-moving member of said apparatus serving to condition such movement.

22. For use in a film handling apparatus having a film-moving member and means for mounting a magazine thereon, a film magazine for supporting and protecting a coiled film and comprising a substantially rectangular housing having a walled edge member with curved corners, an opening in said walled member for rendering the film accessible by said apparatus, tensioning means disposed within the interior of said housing and adjacent one of said curved corners, said tensioning means having a film-engaging surface of a curvature substantially the same as that of said curved portion of said wall, means for mounting a film within said magazine to pass along the interior of said wall adjacent said curved corner and between said corner and said film-engaging surface of said tensioning means, and resilient means for moving said curved film-engaging surface toward said housing, said resilient means being so mounted that it moves said film-engaging surface into close and parallel relation to the adjacent curved corner of the housing, the film thereby being engaged upon one side by said tensioning member and upon the other side by the curve of said housing whereby when the film is not being moved by a film-moving member of said apparatus and hence under tension entry of light to the interior of said housing is impeded, said curved corner of said magazine and said film-engaging surface of said tensioning means in cross section thereupon being substantially parallel and said film-engaging surface under the influence of said resilient means while said film is being moved by a film-moving member of said apparatus serving to condition such movement.

23. A film magazine having a housing, one of the walls of said housing being furnished with an opening, a gate section disposed opposite said opening, a shutter mounted for movement between a position wherein it contacts one end of said gate section and an adjacent portion of a wall of said housing adjacent said opening for cooperating with said gate section to exclude light from the interior of said housing and another position wherein it is positioned away from said gate section and said housing thereby creating an opening through which film may be fed from the interior of said housing and over said gate section, means for moving said shutter from and to light excluding position, and an actuating member for said moving means extending to a point exterior of said housing.

24. A film supporting magazine for use in a film holding apparatus having means for advancing a film, means for establishing a focal plane for the film, and means for mounting a magazine in said apparatus; said magazine having an opening in an edge wall thereof for rendering a film supported by said magazine operable by the film advancing means of the apparatus, a movable gate section disposed adjacent said opening and movable to a position wherein it holds the film supported in said magazine in the focal plane of said apparatus when said magazine is mounted therein, operable means for closing said opening against the entry of light, and control means operatively interconnecting said gate section and said means for closing said opening for concomitantly rendering said closing means inoperative and moving said gate section into said focal plane.

25. A film supporting magazine for use in a film handling apparatus having means for advancing a film, means for establishing a focal plane for the film, and means for mounting a magazine in said apparatus; said magazine having an opening in an edge wall thereof for rendering a film supported by said magazine operable by the film advancing means of the apparatus, a movable gate section disposed adjacent said opening and movable to a position wherein it holds the film supported in said magazine in the focal plane of said apparatus when said magazine is mounted therein, operable means for closing said opening against the entry of light, control means operatively interconnecting said gate section and said means for closing said opening for concomitantly rendering said closing means inoperative and moving said gate section into said focal plane, and an actuating member engageable by said apparatus as said magazine is mounted therein for operating said control means whereby the placing of said magazine in said apparatus moves said gate section into said focal plane and opens said closing means thereby rendering the film operable by the film advancing means of said apparatus.

26. In combination, a film handling apparatus and a film supporting magazine for use therewith; said apparatus having means for advancing a film, means for establishing a focal plane for the film, and means for mounting a magazine in said apparatus; said magazine having an opening in an edge wall thereof for rendering a film supported by said magazine operable by the film advancing means of the apparatus, a movable gate section disposed adjacent said opening and movable to a position wherein it holds the film supported in said magazine in the focal plane of said apparatus when said magazine is mounted therein, operable means for closing said opening against the entry of light, control means operatively interconnecting said gate section and said means for closing said opening for concomitantly rendering said closing means inoperative and moving said gate section into said focal plane, and an actuating member engageable by said apparatus as said magazine is mounted therein for operating said control means whereby the placing of said magazine in said apparatus moves said gate section into said focal plane and opens said closing means thereby rendering the film operable by the film advancing means of said apparatus.

WARREN DUNHAM FOSTER.